(12) United States Patent
Gibson

(10) Patent No.: US 6,648,581 B2
(45) Date of Patent: Nov. 18, 2003

(54) ORDER PICKER TRUCK

(75) Inventor: Christian D. Gibson, Greene, NY (US)

(73) Assignee: The Raymond Corporation, Greene, NY (US)

( * ) Notice: Subject to any disclaimer, the term of this patent is extended or adjusted under 35 U.S.C. 154(b) by 31 days.

(21) Appl. No.: 09/896,754

(22) Filed: Jul. 2, 2001

(65) Prior Publication Data

US 2003/0002971 A1 Jan. 2, 2003

(51) Int. Cl.⁷ .................................................. B66F 9/06
(52) U.S. Cl. .................... 414/663; 414/331.01; 187/222
(58) Field of Search ............... 414/663, 788.1, 414/790.8, 331.01, 331.04, 349, 802; 100/24, 100; 187/222

(56) References Cited

U.S. PATENT DOCUMENTS

| | | | |
|---|---|---|---|
| 1,565,840 A | | 12/1925 | Wise |
| 3,762,589 A | * | 10/1973 | Shaffer .................. 104/127 |
| 4,128,183 A | * | 12/1978 | Finlayson ................ 187/222 |
| 4,150,612 A | * | 4/1979 | Kessler ...................... 100/2 |
| 4,439,102 A | * | 3/1984 | Allen ........................ 414/631 |
| 4,546,593 A | | 10/1985 | Lasscock ................... 53/441 |
| 5,005,709 A | * | 4/1991 | Stokes ....................... 100/34 |
| 5,431,530 A | * | 7/1995 | Kobayashi et al. ....... 198/641 |
| 5,788,015 A | | 8/1998 | Seng et al. ............... 187/222 |
| 5,791,865 A | | 8/1998 | Bublitz ................... 414/794.4 |
| 5,839,542 A | | 11/1998 | Seng et al. ............... 187/222 |
| 5,984,050 A | | 11/1999 | Ronald ..................... 187/226 |
| 5,992,572 A | * | 11/1999 | Gilliland et al. .......... 182/148 |
| 2002/0021956 A1 | * | 2/2002 | Winkler | |

FOREIGN PATENT DOCUMENTS

GB         2 290 281 A    * 12/1995

* cited by examiner

Primary Examiner—Eileen D. Lillis
Assistant Examiner—Charles A. Fox
(74) Attorney, Agent, or Firm—Quarles & Brady LLP

(57) ABSTRACT

An order picker truck includes an extendible mast, and a load platform slidably fixed relative to the extendible mast. An operator platform is slidably fixed relative to the load platform, and a load former is fixed to the operator platform. The load former defines a volume over a portion of the load platform to guide an operator building the load and stabilize the load on the load platform.

29 Claims, 3 Drawing Sheets

ORDER PICKER TRUCK

CROSS REFERENCES TO RELATED APPLICATIONS

Not Applicable

STATEMENT REGARDING FEDERALLY SPONSORED RESEARCH

Not Applicable

BACKGROUND OF THE INVENTION

The present invention relates to order picker trucks, in particular to an order picker truck which provides easy forming of a load on a load platform movable relative to an operator platform.

Order picker trucks are used to pick products from shelves in order to fill a customer order. The products are typically stored in a rack system in which a plurality of unit loads of many products are stored. Each unit load, generally, contains a single type of product, and a customer typically requires one or more boxes of product picked from many different unit loads. This requires an operator to travel up and down one or more aisles of the rack system to pick products from many different locations in the rack system to fill the customer's order.

Typically, each product picked by the operator is placed on a load platform fixed to an operator platform. The platforms are mounted to a telescoping member forming part of a telescoping mast assembly fixed to a truck chassis. The truck chassis is supported by ground engaging wheels which allow the truck to travel in aisles between rows of storage racks. The telescoping mast assembly vertically moves the platforms to reach elevated storage locations in the rack structure.

As the number of picked products increases, the operator stacks products on top of each other to build a load comprising the specific products ordered by the customer. The stacked products increases the height of the load on the load platform. As the height of the load on the load platform increases, adding additional products to the top of load becomes increasingly difficult for the operator. For example, heavier products must be lifted higher by the operator to add the heavy product to the load. In addition, as the load height increases, the load can become unstable. Continued movement of the load platform, such as vertically to a different elevation or horizontally as the order picker truck travels down an aisle, can cause an unstable load to fall off of the load platform which may damage or destroy the product.

SUMMARY OF THE INVENTION

The present invention provides an order picker truck which includes a load former independent of a load platform to maintain the stability of a load and allow easy building of a load on the load platform. The order picker truck includes an extendible mast, and a load platform slidably fixed relative to the extendible mast. An operator platform is slidably fixed relative to the load platform, and a load former is fixed to the operator platform. The load former defines a volume over a portion of the load platform to guide an operator building the load and stabilize the load on the load platform.

A general objective of the present invention is to provide an order picker truck which stabilizes a load built on the load platform. This objective is accomplished by provided a load former which defines a volume above the load platform to stabilize a load.

Another objective of the present invention is to reduce the effort required by an operator to build a load on the load platform. This objective is accomplished by providing a load platform which is vertically movable relative to the operator platform in order to locate a top of the load at a height convenient to the operator for the addition of objects to the load top.

This and still other objectives and advantages of the present invention will be apparent from the description which follows. In the detailed description below, preferred embodiments of the invention will be described in reference to the accompanying drawings. These embodiments do not represent the full scope of the invention. Rather the invention may be employed in other embodiments. Reference should therefore be made to the claims herein for interpreting the breadth of the invention.

DETAILED DESCRIPTION OF THE INVENTION

Figure 1:
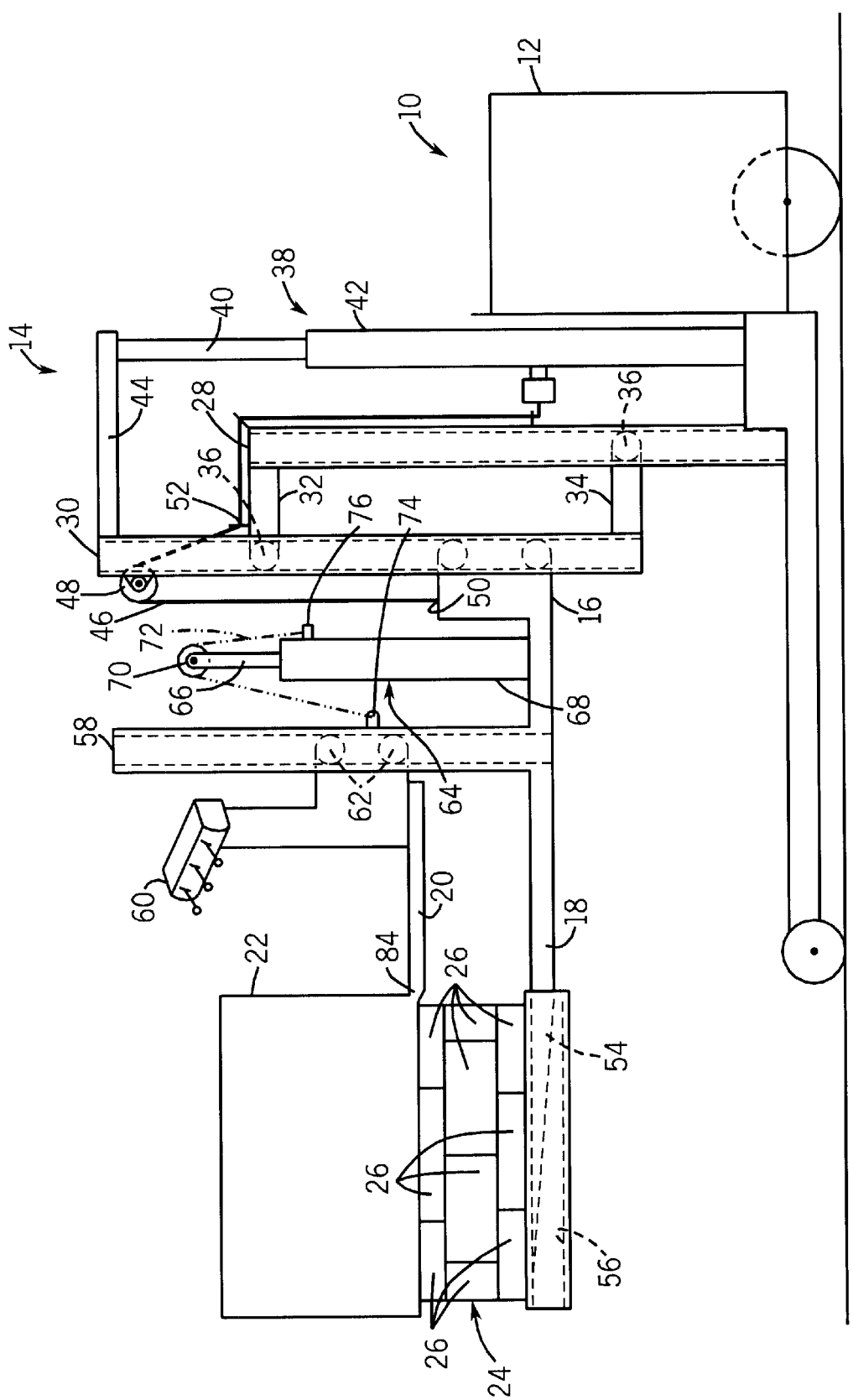
FIG. 1 is a side view of an order picker truck incorporating the present invention.

As shown in FIG. 1, a lift truck 10 includes a chassis 12 having an extendible mast assembly 14 mounted thereon. The mast assembly 14 lifts a carriage 16 which includes a load platform 18 and a vertically movable operator platform 20. A load former 22 fixed to the operator platform 20 forms a load 24 from objects 26 placed on the load platform 18 by an operator. As the objects 26 are placed in the load former 22, the operator can lower the load platform 18 relative to the operator platform 20 to maintain the top of the load 24 at a height convenient to the operator for building the load 24.

In the embodiment shown in FIGS. 1–4, the mast assembly 14 includes a fixed vertical mast 28 fixed to the chassis 12. An extendible telescoping member 30 is slidably mounted to the mast 28, and is vertically movable between a retracted position and an extended position. Upper and lower horizontal spacing members 32, 34 extending between the mast 28 and telescoping member 30 space the mast 28 and telescoping member 30 apart.

The telescoping member 30 is slidably fixed to the mast 28 using methods known in the art, such as disclosed in U.S. Pat. No. 5,984,050 which is incorporated in its entirety herein by reference. Preferably, rollers 36 fixed to an end of each horizontal member 32, 34 engages either the mast 28 or telescoping member 30 to minimize friction as the telescoping member 30 moves between the extended position and retracted position.

A primary hydraulic cylinder 38 mounted to the chassis 12 has a ram 40 extendible from a housing 42. Preferably, the housing 42 is fixed to the chassis 12, and the ram 40 is fixed to the telescoping member 30 to lift the telescoping member 30 to the extended position. The cylinder 38 is offset rearwardly from a longitudinal axis of the telescoping mast 30, and the ram 40 is fixed to a horizontal support member 44 extending rearwardly from proximal the top of the telescoping member 30 over the top of the mast 28. Actuation of the primary hydraulic cylinder 38 extends the ram 40 to lift the telescoping member 30. Of course, one or more primary hydraulic cylinders 38 can be aligned or offset forwardly or rearwardly relative to the longitudinal axis of the telescoping member 30 without departing from the scope of the present invention.

The carriage 16 is mounted to the telescoping member 30 for vertical movement relative thereto, and includes a load platform 18 and an operator platform 20. The carriage 16 is raised to an upper position from a lower position by a chain 46 or wire rope wrapped around a sheave 48 rotatably fixed to an upper end of the telescoping member 30. The chain 46 has one end 50 fixed to the carriage 16 and a second end 52 fixed to the horizontal spacing member 32 fixed to the mast 28. As the telescoping member 30 is lifted by the primary hydraulic cylinder 38, the chain 46 pulls the carriage 16 toward the upper position.

The load platform 18 extends forwardly away from the carriage 16, and includes a pair of forks 54 which can support the a pallet 56. Although forks 54 are preferred, the load platform 18 can be any type of platform, such as a flat plate, which can support a load. Preferably, the load platform 18 is an integral part of the carriage 16 or fixed to the carriage 12 using methods known in the art, such as bolting, welding, and the like. However, the load platform 18 can be independent of the carriage 16 without departing from the scope of the present invention. Preferably, however, the load platform 18 is vertically movable relative to the operator platform 20.

The operator platform 20 is mounted for vertical movement to a carriage vertical member 58 fixed to the carriage 16, and vertically moves between a lower position and an upper position relative to the carriage vertical member 58. The operator platform 20 supports an operator adjacent the load 24, as the operator builds the load 24 on the load platform 18. The operator platform 20 is mounted to the carriage vertical member 58 for vertical movement relative thereto using methods known in the art, such as methods used to mount the telescoping member 30 to the mast 28. Preferably, rollers 62 fixed to the operator platform 20 are used to reduce friction as the operator platform 20 moves between the upper and lower positions.

A secondary hydraulic cylinder 64 mounted to the carriage 16 has a ram 66 extendible from a housing 68. The housing 68 is fixed to the carriage 16, and a sheave 70 is fixed to the ram 66. A chain 72 or wire rope wraps around the sheave 70, and has one end 74 fixed to the operator platform 20 and an opposing end 76 fixed to the cylinder housing 68 Actuation of the secondary hydraulic cylinder 64 extends the ram 66 to lift the sheave 70, and pull the operator platform 20 upward toward the upper position. Of course, the ram 66 can be fixed directly to the operator platform 20 without departing from the scope of the present invention.

Figure 2:
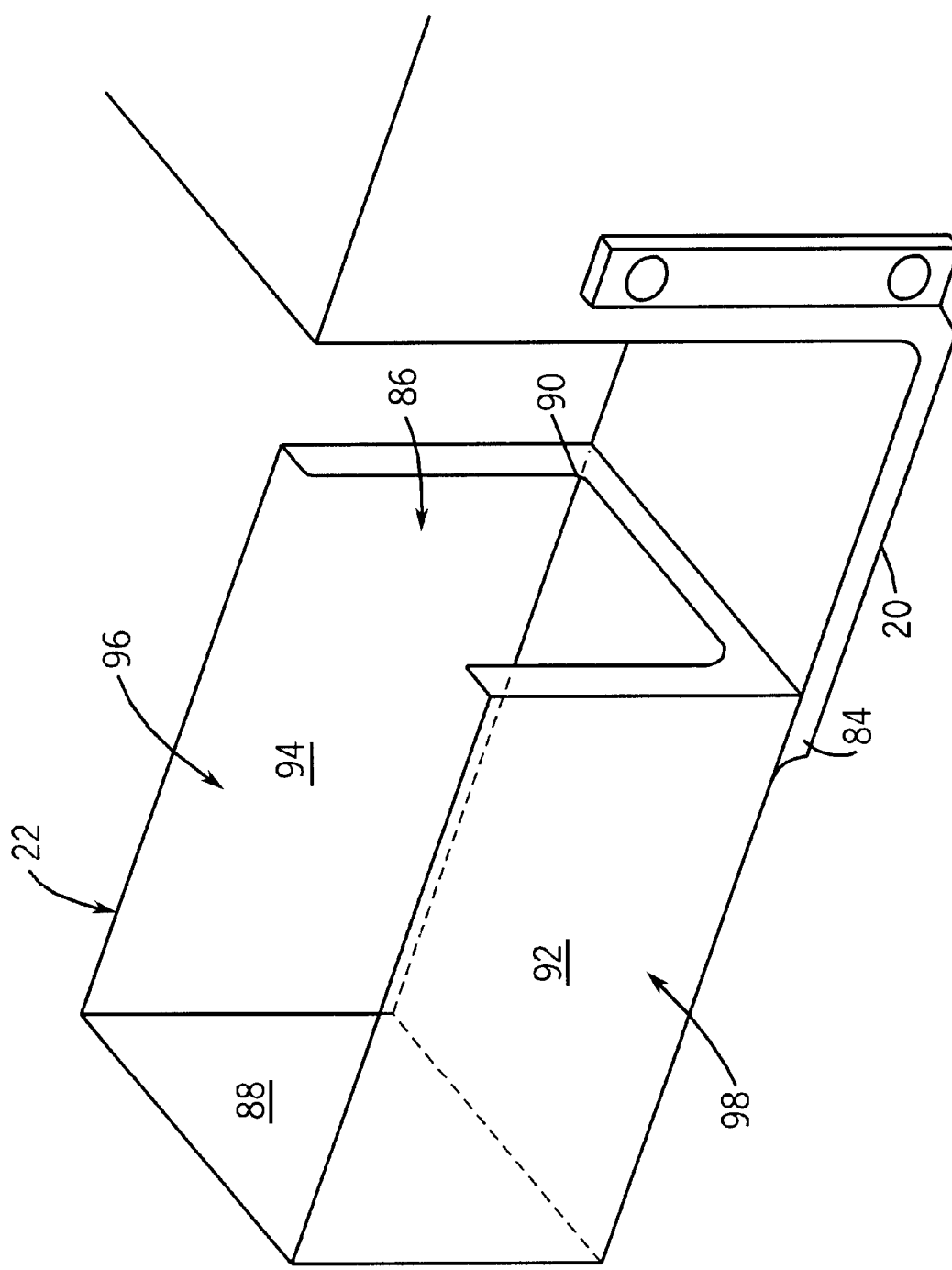
FIG. 2 is a perspective view of the load former of FIG. 1.

Referring to FIGS. 1 and 2, the load former 22 is fixed to a forward edge 84 of the operator platform 20, and maintains the objects 26 which form the load 24 within a predetermined volume 86 above the load platform 18. The load former 22 includes a front wall 88 and rear wall 90 joined by side walls 92, 94, and has an open top 96 and open bottom 98. The walls 88, 90, 92, 94 define the volume 86 which extends upwardly from the load platform 18 between the load former walls 88, 90, 92, 94. Preferably, the rear wall 90 faces the operator platform 20, and is at least partially open (i.e. has a height which is less than the other walls) to allow easy access for an operator to place an object 26 into the volume 86 to build the load 24 on the load platform 18. Although a load former 22 having an open rear wall 90 is disclosed, the volume 86 can be defined by a load former having only front and side walls, a load former having walls of equal height, or a load former having walls of unequal heights wherein the rear wall height is not less than the other walls without departing from the scope of the present invention.

Figure 3:
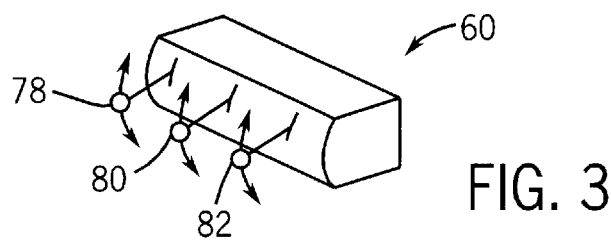
FIG. 3 is a perspective view of the control panel of FIG. 1.

Referring to FIGS. 1 and 3, preferably, the operator platform 20 includes a control panel 60 which allows the operator to control the vertical position of the operator platform 20 and load platform 18 relative to each other and the chassis 12. Advantageously, providing the operator with the ability to control the vertical position of the load platform 18 relative to the operator platform 20 provides the operator with the ability to maintain the top of the load 24 at a height convenient to the operator for building the load 24.

The control panel 60 includes three switches 78, 80, 82 which control the movement of the load platform 18 and operator platform 20. The first switch 78 controls the vertical movement of the carriage 16, and thus, the simultaneous vertical movement of load and operator platforms 18, 20 relative to the chassis 12. The second switch 80 controls the vertical movement of the operator platform 20 relative to the load platform 18. The third switch 82 controls the vertical movement of the load platform 18 relative to the operator platform 20.

Figure 4:
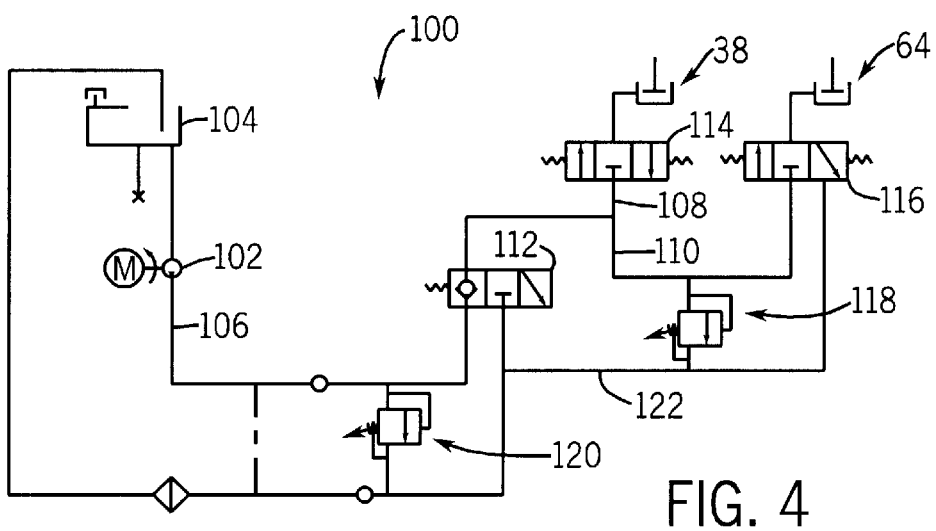
FIG. 4 is a hydraulic circuit schematic of the order picker truck of FIG. 1.

Referring to FIGS. 1, 3, and 4, the operator and load platforms 18, 20 are moved vertically by the primary and secondary hydraulic cylinders 38, 64 which are actuated by a hydraulic circuit 100 responding to inputs from the control panel switches 78, 80, 82. The hydraulic circuit 100 includes a pump 102 which pumps hydraulic fluid from a reservoir 104 through a main supply hydraulic line 106. The main supply hydraulic line 106 feeds the hydraulic fluid into branch lines 108, 110 leading to each of the hydraulic cylinders 38, 64. Three position control valves 112, 114, 116 actuated by the control panel switches 78, 80, 82 control the flow of hydraulic fluid through the circuit 100. Pressure relief valves 118, 120 disposed in the circuit 100 are operable to allow fluid to pass into a return line 122 if the fluid pressure inside the circuit 100 reaches a predetermined level.

The three position main control valve 112 controls the flow of fluid to the branch lines 108, 110 through the main supply line 106. The main control valve 112 has a first position which allows fluid to flow through the main supply line 106 toward the branch lines 108, 110. A second position prevents fluid from flowing past the main control valve 112 into the branch lines 108, 110. A third position allows fluid to flow from the branch lines 108, 110 into a return line back to the reservoir 104.

The carriage three position control valve 114 controls the hydraulic fluid flowing through the branch line 108 to actuate the primary hydraulic cylinder 38 lifting the carriage 16. The carriage three position control valve 114 has a first position which allows fluid to fill the primary cylinder 38 and extend the ram 40 to lift the carriage 16. A second position prevents fluid from flowing into or out of the primary cylinder 38. A third position allows fluid to flow out of the primary cylinder 38 and back into the branch line 108.

The operator platform three position control valve 116 controls the hydraulic fluid flowing through the branch line 110 which actuates the secondary hydraulic cylinder 64 lifting the operator platform 20. The operator platform three position control valve 116 has a first position which allows fluid to fill the secondary cylinder 64 and extend the ram 66 to lift the operator platform 20. A second position prevent fluid from flowing into or out of the secondary cylinder 64. A third position allows fluid to flow out of the secondary cylinder 64 and directs the fluid to the return line 122 leading back into the reservoir 104.

The valves 112, 114, 116 are controlled by the control panel switches 78, 80, 82 to control the movement of the load platform 18 and operator platform 20. Each control panel switch 78, 80, 82 is electrically connected to one or more solenoids (not shown) which position the valves 112, 114, 116 as required to direct the hydraulic fluid into or out of the cylinders 38, 64.

The first control panel switch 78 controls the vertical movement of the carriage 16 by actuating solenoids which position the main control valve 112 and carriage control valve 114. When raising the carriage 16, the main control valve 112 and carriage control valve 114 are positioned to allow hydraulic fluid into the primary cylinder 38 to lift the carriage 12. When only the first switch is actuated, the operator platform control valve 116 is positioned to prevent fluid from entering or leaving the secondary cylinder 64. When lowering the carriage, the solenoids actuated by the first control panel switch 78 position the main control valve 112 and carriage control valve 114 to allow hydraulic fluid to flow out of the primary cylinder 38 and return to the reservoir 104.

The second control panel switch 80 controls the vertical movement of the operator platform 20 relative to the load platform 18 by actuating solenoids which position the operator platform control valve 116 and main control valve 112, such that fluid flows through the operator platform control valve 116 into the secondary cylinder 64 when lifting the operator platform 20 relative to the load platform 18. When lowering the operator platform 20 relative to the load platform 18, the second control switch 80 actuates solenoids which position the operator platform control valve 116 such that fluid flows out of the secondary cylinder 64 and is directed to the return line 122 leading back into the reservoir 104.

The third control panel switch 82 controls lowering the load platform 18 relative to the operator platform 20 by actuating solenoids which position the main control valve 112 to prevent hydraulic fluid from flowing through the supply line 106. The third control panel switch 82 also actuates solenoids which position the carriage control valve 114 to allow hydraulic fluid to flow out of the primary cylinder 38, and the operator platform control valve 116 is positioned to allow hydraulic fluid to flow into the secondary cylinder 64. Advantageously, when the primary cylinder 38 and secondary cylinder 64 are the same size (i.e. have the same pressure area), the operator platform 20 will rise at the same rate as the carriage 16 descends to maintain the operator platform 20 at a constant height while the load platform 18 is lowered. Of course, other methods for lowering the load platform 18 while maintaining the operator platform 20 at a constant vertical position above the chassis 12 can used, such as by independently controlling the operator platform 20 and load platform 18 using limit switches, encoders, and the like with controllers, without departing from the scope of the present invention.

In use, the pallet 56 is positioned on the load platform 18 beneath the load former 22. An operator raises the carriage 16 to a desired vertical position above the chassis 12 to pick objects 26 from an adjacent shelf, and place the objects 26 on the pallet 56 within the volume 86 defined by the load former 22. Preferably, the load platform 18 and operator platform 20 are initially vertical positioned relative to each other to allow the operator to easily place each object 26 within the volume 86 defined by the load former 22.

As the operator builds the load 24 within the volume 86, the operator lowers the load platform 18 relative to the operator platform 20 using the control panel switches 78, 80, 82 to maintain the top of the load 24 at a height which continues to allow easy placement of objects 26 within the volume 86 defined by the load former 22. Advantageously, the load former 22 maintains the objects 26 within the volume 86, and prevents the objects 26 from becoming unstable as the size of the load 24 increases or as the operator maneuvers the order picker truck 10 to pick additional objects 26 from additional locations. Preferably, the operator lowers the load platform 18 relative to the operator platform 20 using the third control switch 82 which lowers the load platform 18 while maintaining the operator platform 20 at a constant vertical position relative to the chassis 12.

Figure 5:
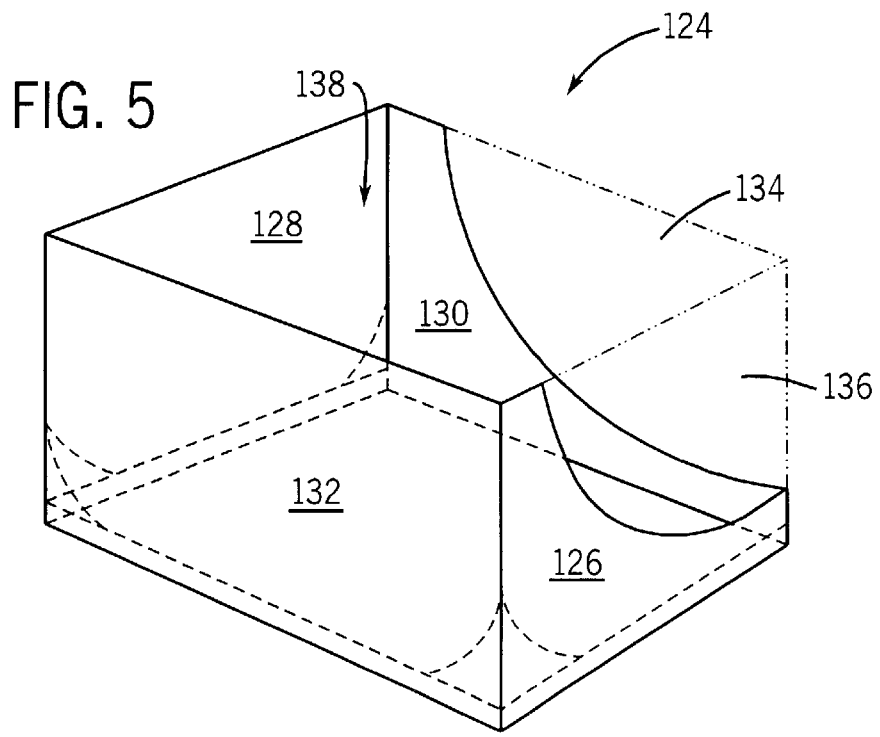
FIG. 5 is a perspective view of an alternative load former.

In another embodiment, shown in FIG. 5, a load former 124 includes a front 126 wall and rear wall 128 joined by side walls 130, 132. The front wall 126 and one side wall 130 include cutouts 134, 136 which allow an operator to easily access the volume 138 defined by the walls 126, 128, 130, 132 when building a load. Although cutouts 134, 136 formed in the front wall 126 and one side wall 130 are shown, a cutout can be formed in one or more of the walls to provide access to the volume for the operator without departing from the scope of the present invention.

While there has been shown and described what are at present considered the preferred embodiments of the invention, it will be obvious to those skilled in the art that various changes and modifications can be made therein without departing from the scope of the invention defined by the appended claims.

I claim:

1. An order picker truck comprising:
   a chassis;
   an operator platform fixed to said chassis, and vertically movable relative to said chassis for lifting an operator;
   a load platform fixed to said chassis, and vertically movable relative to said chassis and said operator platform for receiving objects picked by the operator; and
   a load former fixed over said load platform and vertically movable relative to said load platform, and defining a volume above a portion of said load platform for receiving the objects picked by the operator.

2. The order picker truck as in claim 1, in which said load platform is vertically movable relative to said operator platform, and a vertical height of said operator platform above said chassis is controllable to vertically position said load platform relative to said operator platform for receiving the objects.

3. The order picker truck as in claim 2, in which said vertical height is controlled by a control panel fixed to said operator platform.

4. The order picker truck as in claim 1, in which said operator platform and said load platform are fixed to a carriage supported by a mast assembly fixed to said chassis.

5. The order picker truck as in claim 1, in which said load platform includes a pair of forks extending beneath said load former.

6. The order picker truck as in claim 1, in which said load former includes walls which define said volume.

7. The order picker truck as in claim 6, in which one of said walls face said operator platform, and said one of said walls has a height which is less than at least one of the other of said walls.

8. The order picker truck as in claim 6, in which at least one of said walls includes a cutout.

9. The order picker truck as in claim 1, in which said operator platform and load platform are vertically moved by at least one hydraulic cylinder in fluid communication with a hydraulic circuit.

10. The order picker truck as in claim 9, in which said hydraulic circuit actuates said at least one hydraulic cylinder to vertically move said load platform in a downwardly direction while maintaining said operator platform at a fixed height.

11. The order picker truck as in claim 1, in which a first hydraulic cylinder vertically moves said load platform and operator platform, and a second hydraulic cylinder having one end fixed to said load platform and a second end fixed to said operator platform vertically moves said operator platform relative to said load platform, wherein said first hydraulic cylinder operates to lower said load platform and operator platform while said second hydraulic cylinder operates to raise said operator platform relative to said load platform in order to lower said load platform relative to said operator platform while maintaining said operator platform at a fixed height relative to said chassis.

12. The order picker truck as in claim 11, in which said first and second cylinders defined substantially equal pressure areas.

13. The order picker truck as in claim 1, in which said load former is vertically fixed to said operator platform.

14. An order picker truck comprising:
a chassis;
an operator platform fixed to said chassis, and vertically movable relative to said chassis for lifting an operator;
a load platform fixed to said chassis, and vertically movable relative to said operator platform for receiving objects picked by the operator, and a vertical height of said operator platform being controllable to vertically position said load platform relative to said operator platform for receiving the objects; and
a load former fixed vertically relative to said operator platform over said load platform.

15. The order picker truck as in claim 14, in which said vertical height is controlled by a control panel fixed to said operator platform.

16. The order picker truck as in claim 14, in which said load former includes walls which define said volume.

17. The order picker truck as in claim 16, in which at least one of said walls includes a cutout.

18. The order picker truck as in claim 16, in which one of said walls face said operator platform, and said one of said sides has a height which is less than at least one of the other of said sides.

19. The order picker truck as in claim 14, in which said operator platform and said load platform are fixed to a carriage supported by a mast assembly fixed to said chassis.

20. The order picker truck as in claim 19, in which said load platform is vertically fixed to said carriage, and said operator platform is mounted to said carriage for vertical movement.

21. The order picker truck as in claim 14, in which said operator platform and load platform are vertically moved by at least one hydraulic cylinder in fluid communication with a hydraulic circuit.

22. The order picker truck as in claim 21, in which said hydraulic circuit actuates said at least one hydraulic cylinder to vertically move said load platform in a downwardly direction while maintaining said operator platform at a fixed height.

23. The order picker truck as in claim 14, in which a first hydraulic cylinder vertically moves said load platform and operator platform, and a second hydraulic cylinder having one end fixed to said load platform and a second end fixed to said operator platform vertically moves said operator platform relative to said load platform, wherein said first hydraulic cylinder operates to lower said load platform and operator platform while said second hydraulic cylinder operates to raise said operator platform relative to said load platform in order to lower said load platform relative to said operator platform while maintaining said operator platform at a fixed height relative to said chassis.

24. The order picker truck as in claim 23, in which said first and second cylinders define substantially equal pressure areas.

25. An order picker truck comprising:
a chassis;
an operator platform fixed to said chassis, and vertically movable relative to said chassis for lifting an operator;
a load platform fixed to said chassis, and vertically movable relative to said operator platform for receiving objects picked by the operator, and a vertical height of said operator platform being controllable to vertically position said load platform relative to said operator platform for receiving the objects; and
a load former fixed vertically relative to said operator platform and vertically movable relative to said load platform, and defining a volume above a portion of said load platform for receiving the objects picked by the operator.

26. The order picker truck as in claim 25, in which said operator platform and said load platform are fixed to a carriage supported by a mast assembly fixed to said chassis.

27. The order picker truck as in claim 26, in which said load platform is vertically fixed to said carriage, and said operator platform is mounted to said carriage for vertical movement.

28. The order picker truck as in claim 25, in which said operator platform and load platform are vertically moved by at least one hydraulic cylinder in fluid communication with a hydraulic circuit.

29. The order picker truck as in claim 28, in which said hydraulic circuit actuates said at least one hydraulic cylinder to vertically move said load platform in a downwardly direction while maintaining said operator platform at a fixed height relative to said chassis.

* * * * *